Patented Apr. 25, 1933

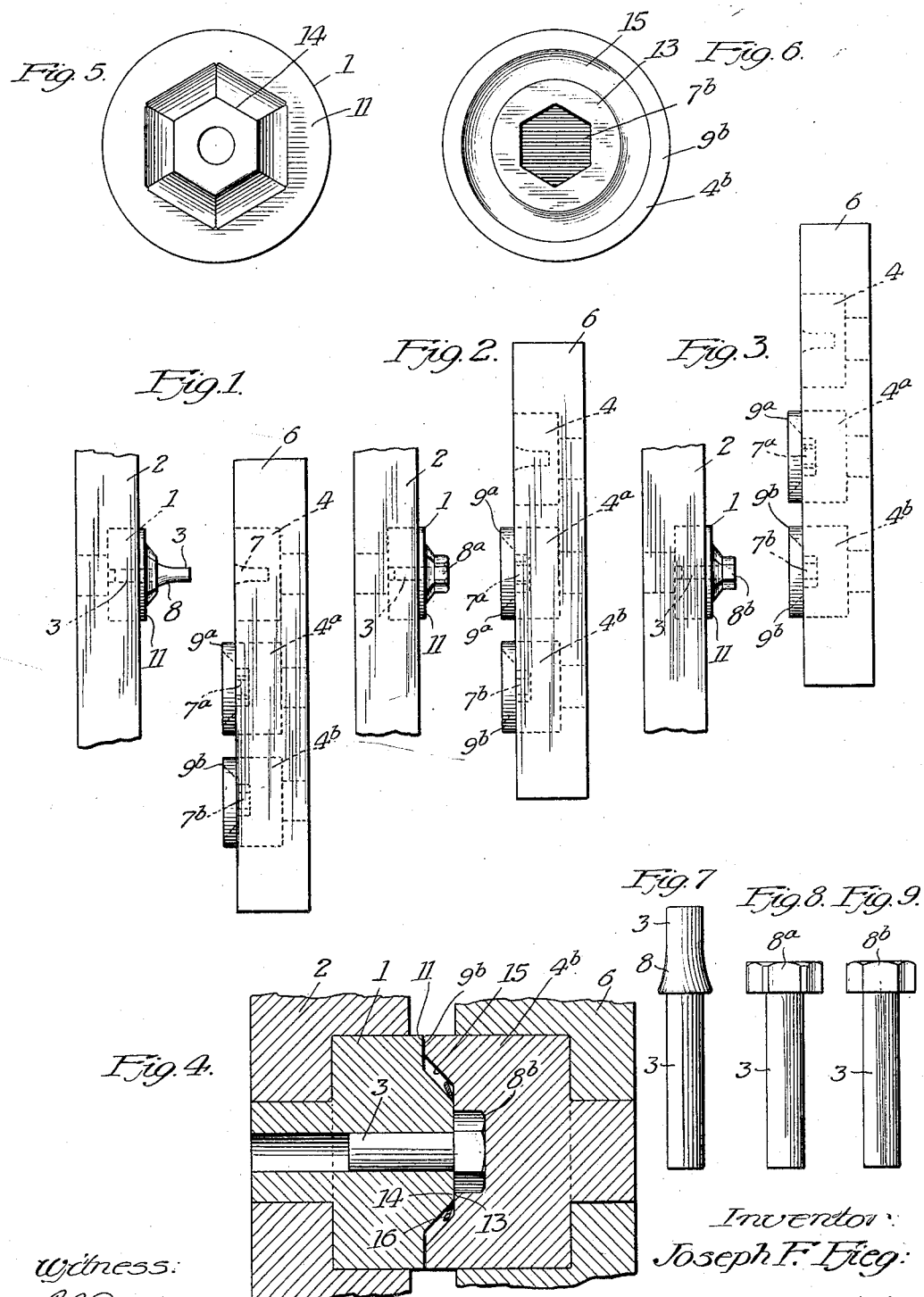

1,905,084

UNITED STATES PATENT OFFICE

JOSEPH F. FIEG, OF LA GRANGE, ILLINOIS, ASSIGNOR TO UNITED SCREW AND BOLT CORPORATION, OF CHICAGO, ILLINOIS, A CORPORATION OF OHIO

MANUFACTURE OF BOLTS

Application filed November 28, 1930. Serial No. 498,636.

This invention relates to the manufacture of bolts and screws and more particularly machine bolts and cap screws where it is desired to have an accurately finished bolt or screw head.

In the manufacture of machine bolts and cap screws it is customary to make the blank in two machines, one generally termed a heading machine and the other generally termed a trimming machine. The heading machine ordinarily cuts the stock into the proper length and then in two forming blows first forms a conical shaped head upon the end of the stock and then a circular flat head. Two blows are necessary to provide a head of standard or large size due to the amount of metal upset to form the head.

The headed blanks thus formed must then be delivered to the trimming machines where the heads previously formed to a circular or cylindrical shape are given the desired hexagonal or other shape by means of a trimming or shearing operation. In the trimming machine the round heads formed upon the bolt blanks are trimmed into hexagonal or other desired shape by a pair of die members movable toward each other, one of these members having a die recess therein of the size and shape of the desired finished head. The two members are brought together with sufficient clearance therebetween to accommodate the flash or scrap material removed from the head. The blank is then pushed entirely through the die member having the recess therein. In most instances a dwell period is provided in the movement of the dies toward each other which occurs at the period when the blank is pushed through the recessed die member as the pushing of the blank through the die members removes the scrap or flash which is left by reason of the fact that the die members do not come close enough together to entirely remove the waste material. It is of course desirable to eliminate the relatively complicated mechanism necessary to produce this dwell in the movement of the dies and to have the die members come close enough to trim the surplus material from the formed head. This has not been practicable, however, because of the danger of injuring or destroying the dies through contact of their working surfaces.

It is the purpose of this invention to provide apparatus whereby the labor, equipment and material involved is substantially reduced.

It is also an object of this invention to reduce both the number of steps and the number of machines used, prolong the life of the wearing parts and produce a uniform product.

In accordance with this invention the bolt or screw head is formed directly from the stock when the head is of relatively small size or from the usual conically shaped upset end portion when the head is of standard or larger proportions. The customary stage in the manufacture of some sizes of bolts or screws in which the head is of circular or cylindrical formation may be omitted to cause a saving of material. In some instances it is also desirable to form the head and all the stock directly into a partially formed head either from the straight stock or from the conically shaped upset end portion.

If the head is upset into a partially flat sided head less material is upset than when formed into a circular head of sufficient diameter to include an entire head and less material need be trimmed in forming the finished head from the partially shaped head than from a circular head. In view of the reduction of material for a given size bolt or screw and the consequential upsetting of less material in forming the head the complete head formed and trimmed may be made in some instances in two blows. Exceptionally large heads heretofore requiring four blows may, in accordance with my invention, be produced with three blows. Furthermore, since the partially formed head is already properly positioned and held with respect to the trimming die, the final trimming of the head may be done in the heading machine without the necessity of complicated registering mechanism which would be required if the partially formed head were delivered to another machine for trimming. In other words, the trimming machine as such is entirely eliminated and also the labor of handling work in process between machines.

As an essential feature permitting this saving of material and possible elimination of one step in the old process, means are provided for positively controlling the relative movements of the two forming die members or the punch and die with particular reference to the opposed working faces of the punch and die, whereby these members may be positively and accurately brought into sufficiently close relation to effect the trimming operation without permitting injurious contact between the opposed surfaces. With this end in view, the forming or die members themselves are provided with opposed abutment surfaces so disposed relatively to the working surfaces of the dies that the approach of these working surfaces is positively limited at each blow thereby making it possible to bring the dies into such close relation that the trimming operation may be properly completed without danger of injury to the dies.

A better understanding of this invention will be obtained from the following description given in connection with the drawing which illustrates the invention as applied to a multiple stroke header and in which:

Fig. 1 illustrates the die and punch members separated after the first blow,

Fig. 2 illustrates diagrammatically the same members separated after the second blow, Fig. 3 illustrates the same members separated after the third blow, Fig. 4 is an enlarged transverse section through the punch and die members when in closed position as they appear as the third blow, Fig. 5 is an enlarged front elevation of the die member, Fig. 6 is an enlarged front elevation of the punch member, and Figs. 7, 8 and 9 illustrate respectively the three steps in the formation of a cap screw as shown in Figs. 1, 2 and 3, respectively.

Referring more particularly to the drawing, the invention has been illustrated as applied to a three blow header employing solid forming or die members, i. e., both a solid punch and a solid die. In this connection the die member which holds and supports the stock in the form of a round rod is referred to as the die and may be either open or solid, while the die members which have forming recesses therein for receiving the projecting end of the stock and forming the same into the projecting head portion of the bolt or screw are referred to as the punches, regardless of which members are movable and these punches also may be either of the open or solid type. It will be understood of course that the forming members, that is, either the punch or the dies, may be used not only in a heading machine of the type illustrated but may be used in a trimming machine as well or in any other machine suitable for the purpose.

In Figs. 1 to 3, are shown the forming members of a three blow header in which the die 1 is mounted in a relatively stationary support 2 and is adapted to receive and support a piece of stock 3 with one end projecting outwardly to be engaged successively by the punches 4, 4a and 4b carried by a traveling hammer or punch slide 6. The slide 6 is reciprocable in a horizontal direction and is also movable vertically to present the punches 4, 4a and 4b successively in alignment with die 1. Punch 4, a coning punch, is for illustrative purposes shown as provided with a conical recess 7 which upsets the projecting end of the stock into a conically shaped head 8 as shown in Figs. 1 and 7.

Punch 4a, generally termed a heading punch, is here provided with a hexagonally shaped die recess 7a although any other preferred shape may be employed, the recess being larger than the finished head of the bolt or screw. With the use of the hexagonal heading punch the distance across flats of the partially formed head is greater than that of the finished head but the surface areas of the flats are smaller with the intersecting corners not sharply defined. The action of punch 4a is illustrated in Figs. 2 and 8 from which it can be seen that the head partially formed by the second blow is substantially hexagonal in shape, the flat surfaces being relatively small and the corners being incompletely formed, the head of the bolt or screw then appearing as at 8a and the heading operations being complete, it is only necessary to trim the formed blank.

In the position shown in Fig. 3, slide 6 has moved upwardly and has made a third blow. In other words, as shown in Fig. 3, the trimming blow has been completed and the slide 6 and punch 4b retracted from die 1. Punch 4b, also termed a trimming die and which occupies the position normally assumed by the heading die, is provided with a central die recess 7b which is hexagonal and of the exact dimensions of the finished head 8b of the bolt.

The outer rim portions of the punches 4a and 4b surrounding the die recesses 7a and 7b project beyond the plane of the working surfaces of the dies to form abutment surfaces 9a and 9b which engage the annular rim portion 11 of the die member to limit the relative movement of the punches 4a and 4b toward die 1. The surfaces 9a, 9b and 11 are carefully finished to predetermined dimensions relatively to the opposed working surfaces in order to accurately and positively limit the approach of these opposed working surfaces of the punch and die at each blow. The relative position of abutment surfaces 9a, 9b and 11 to working surfaces 13 and 14 is such as to maintain proper minimum space between working faces 13 and 14 of heading punch and supporting die. The projecting rim portions of the punches 4a and 4b cause the remaining surfaces of the punches 4a and 4b between the surfaces 9a and 9b and die recesses 7a and 7b to be spaced from the opposed die surface and to provide a chamber 15 (Fig. 4) for the reception of surplus scrap material known as the flash.

The final blow or step which results in a trimming or shearing action is more clearly illustrated in Fig. 4 which clearly shows the close proximity into which the two die members may be brought. In actual practice it has been found desirable to bring the working surface 13 or cutting or outer peripheral edge of the die recess within a few thousandths of an inch of the working surface 14 or cutting edge of die 1. By bringing the two opposed edges of the die members into this close proximity but not quite in contact, the working surfaces or cutting edges are preserved and yet the flash or scrap material 16 is sufficiently severed and will fall into the recess 15 and drop out of the machine upon the separation of the die members.

From the foregoing description it will be appreciated that a completed bolt or screw blank ready for the final machining operations is prepared from less material than used heretofore for the same size bolt and with fewer blows. At an intermediate stage the bolt head is in the shape of a partially formed head. The punch and die members are positively moved into extremely close proximity at each blow, this being made possible by the controlling contact or abutment surfaces. Due to the latter, the flash or scrap material is completely severed without the necessity of a separate trimming machine and without the necessity of projecting the blank completely through a die.

The moving of the die members into this close proximity has not been possible heretofore due to the lack of accurate control means. Because of the necessary bearing clearances provided in the actuating mechanisms of machines and the inherent elasticity in the various machine elements damage would result to the working surfaces of the die members if no means for accurately limiting the approach of the die members were provided.

With the accurate control provided by this invention the die members may be brought close enough to permit complete trimming and yet prevent damage to the die members which would result if the opposed working faces 13 and 14 of these members were to actually contact with each other.

It is obvious that this invention may be applied to any standard actuating mechanism for operating the die members which is well understood by those skilled in the art and is not illustrated for that reason.

It is also obvious that minor changes may be made in the details of construction such as to vary the shape of the heads without departing from the spirit and scope of this invention as defined in the following claims.

I claim:

1. A pair of die members for use in a bolt or screw forming machine, one of said die members being provided with a recess to receive a piece of stock, the other of said die members being provided with a die recess therein, one of said members being further provided with a projecting abutment surface arranged to engage the other die member and limit the relative movement of said members toward each other, one of said members also being recessed to provide a depository to receive scrap material trimmed from the stock.

2. In a heading machine, a single die for supporting a piece of stock, a plurality of punches movable successively into operative position with respect to said die for forming a head upon the stock held by said die, one of said punches having a die recess therein larger than the finished bolt head and shaped to form a partially completed head having flat sides and another of said punches having a die recess therein of the size of the finished bolt head for trimming the partially formed head whereby a completely finished bolt and screw head may be made in a single machine and means for positively restricting the relative movement between said trimming punch and said die independently of the presence of stock in said die and of the actuating means for the punches and die.

3. In a heading machine, a single die for supporting a piece of stock, a plurality of punches movable successively into operative position with respect to said die for forming a head upon the stock held by said die, one of said punches having a generally conically shaped die recess therein for upsetting the end of the blank, another of said punches having a die recess therein larger than the finished bolt head and shaped to form a partially completed head having flat sides and another of said punches having a die recess therein of the size of the finished bolt head for trimming the partially formed head whereby a completely finished bolt and screw head may be made in a single machine and means for positively restricting the relative movement between said trimming punch and said die independently of the presence of stock in said die and of the actuating means for the punches and die.

4. In a heading machine, a single die for supporting a piece of stock and a plurality of punches movable successively into operative position with respect to said die for forming a head upon the stock held by said die, one of said punches having a die recess therein larger than the finished bolt head and shaped to form a partially completed head having flat sides and another of said punches having a die recess therein of the size of the finished bolt head whereby a head may be formed and trimmed while the stock is held in said die, one of said punches and die members also having cooperative abutment faces disposed in predetermined relation to the opposed faces of said die and punch and arranged to positively limit the movement of said punches and die toward each other independently of the presence of stock in said die and of the actuating means for said punches and die.

5. In a heading machine, a single die for supporting a piece of stock and a plurality of punches movable successively into operative position with respect to said die for forming a head upon the stock held by said die, one of said punches having a generally conically shaped die recess therein, another of said punches having a die recess therein larger than the finished bolt head and shaped to form a partially completed head having flat sides and another of said punches having a die recess therein of the size of the finished bolt head whereby a head may be formed and trimmed while the stock is held in said die, one of said punches and die members also having cooperative abutment faces disposed in predetermined relation to the opposed faces of said die and punch and arranged to positively limit the movement of said punches and die toward each other independently of the presence of stock in said die and of the actuating means for said punches and die.

6. In a heading machine, a single die for supporting a piece of stock and a plurality of punches movable successively into operative position with respect to said die for forming a head upon the stock held by said die, one of said punches having a die recess therein larger than the finished bolt head and shaped to form a partially completed head having flat sides and another of said punches having a die recess therein of the size of the finished bolt head whereby a head may be formed and trimmed while the stock is held in said die, one of said punches and die members also having cooperative abutment faces disposed in predetermined relation to the opposed faces of said die and punch and arranged to contact with each other to positively limit the movement of said punches and die toward each other independently of the presence of stock in said die and of the actuating means for said punches and die.

7. In a heading machine, a single die for supporting a piece of stock and a plurality of punches movable successively into operative position with respect to said die for forming a head upon the stock held by said die, one of said punches having a generally conically shaped die recess therein, another of said punches having a die recess therein larger than the finished bolt head and shaped to form a partially completed head having flat sides and another of said punches having a die recess therein of the size of the finished bolt head whereby a head may be formed and trimmed while the stock is held in said die, said punches and die members also having cooperative abutment faces disposed in predetermined relation to the opposed faces of said die and punch and arranged to contact with each other to positively limit the movement of said punches and die toward each other independently of the presence of stock in said die and of the actuating means for said punches and die.

8. In a heading machine, a single die for supporting a piece of stock and a plurality of punches movable successively into operative position with respect to said die for forming a head upon the stock held by said die, one of said punches having a die recess therein larger than the finished bolt head and shaped to form a partially completed head having flat sides and another of said punches having a die recess therein of the size of the finished bolt head whereby a head may be formed and trimmed while the stock is held in said die, said die also having an abutment face disposed in predetermined relation to the stock engaging face of said die and arranged to positively limit the movement of said punches and die toward each other independently of the presence of stock in said die and of the actuating means for said punches and die.

9. In a heading machine, a single die for supporting a piece of stock and a plurality of punches movable successively into operative position with respect to said die for forming a head upon the stock held by said die, one of said punches having a generally conically shaped die recess therein, another of said punches having a die recess therein larger than the finished bolt head and shaped to form a partially completed head having flat sides and another of said punches having a die recess therein of the size of the finished bolt head whereby a head may be formed and trimmed while the stock is held in said die, said die also having an abutment face disposed in predetermined relation to the stock engaging face of said die and arranged to positively limit the movement of said punches and die toward each other independently of the presence of stock in said die and of the actuating means for said punches and die.

10. In a heading machine, a single die for supporting a piece of stock and a plurality of punches movable successively into operative position with respect to said die for forming a head upon the stock held by said die, one of said punches having a die recess therein larger than the finished bolt head and shaped to form a partially completed head having flat sides and another of said punches having a die recess therein of the size of the finished bolt head whereby a head may be formed and trimmed while the stock is held in said die, said punch also having an abutment face disposed in predetermined relation to the edge of said recess and arranged to positively limit the movement of said punches and die toward each other independently of the presence of stock in said die and of the actuating means for said punches and die.

11. A die member for use in a bolt or screw forming machine having a portion thereof operative in cooperation with another die member to form a head upon a piece of stock and having a contacting portion disposed at a predetermined distance from the operative portion of the die members and arranged to act as an abutment to limit the relative movements of said die members with respect to the operative faces thereof independently of the presence of stock in said die members and of the actuating means for said die members.

12. A die member for use in a bolt or screw forming machine having a central portion thereof operative in cooperation with another die member to form a head upon a piece of stock and having a contacting portion surrounding said central forming portion and disposed at a predetermined axial distance relatively thereto and arranged to act as an abutment to limit the relative movements of said die members with respect to their operative faces independently of the presence of stock in said die members and of the actuating means for said die members.

13. A die member for use in a bolt or screw forming machine in conjunction with another forming member and having a die recess therein and an abutment surface projecting in a direction parallel to the longitudinal axis of the die a predetermined distance with respect to the edge of said recess to prevent contact of the edge of said recess with the surface of the cooperating forming member.

14. A pair of die members for use in a bolt or screw forming machine, one of said die members being provided with a recess to receive a piece of stock, the other of said die members being provided with a die recess therein, one of said members being further provided with an abutment surface projecting a predetermined distance with respect to the outermost operating surface of the member and arranged to engage the other die member and limit the relative movement of said members toward each other.

15. In a heading machine, a pair of die members operatively associated to form a head upon a piece of stock and means contacting with one of said die members to prevent their abutting cooperating faces from coming into contact with each other independently of the presence of stock in said die members and of the actuating means for said die members.

In witness of the foregoing I affix my signature.

JOSEPH F. FIEG.

CERTIFICATE OF CORRECTION.

Patent No. 1,905,084. April 25, 1933.

JOSEPH F. FIEG.

It is hereby certified that error appears in the printed specification of the above numbered patent requiring correction as follows: Page 2, line 39, for "as" second occurrence read "at"; page 5, line 73, claim 15, strike out the word "abutting"; and that the said Letters Patent should be read with these corrections therein that the same may conform to the record of the case in the Patent Office.

Signed and sealed this 13th day of June, A. D. 1933.

M. J. Moore.

(Seal) Acting Commissioner of Patents.